United States Patent [19]

Barksdale

[11] Patent Number: 5,785,162
[45] Date of Patent: Jul. 28, 1998

[54] RE-INDEXING MANUAL TRANSMISSION SYNCHRONIZER

[75] Inventor: John Shaw Barksdale, Ann Arbor, Mich.

[73] Assignee: Ford Global Technologies, Inc., Dearborn, Mich.

[21] Appl. No.: 784,221

[22] Filed: Oct. 16, 1997

[51] Int. Cl.⁶ ............................................. F16D 23/06
[52] U.S. Cl. ............................. 192/53.331; 192/53.34
[58] Field of Search ........................... 192/53.31, 53.3, 192/53.331, 53.34

[56] References Cited

U.S. PATENT DOCUMENTS

| | | |
|---|---|---|
| 2,736,411 | 2/1956 | Schmid .................... 192/53.3 |
| 4,566,568 | 1/1986 | Yant . |
| 4,660,707 | 4/1987 | Sandanori et al. . |
| 4,811,825 | 3/1989 | Christian et al. ............ 192/53.34 X |
| 4,889,003 | 12/1989 | Rietsch . |
| 5,054,595 | 10/1991 | Lutz et al. ................. 192/53.34 |
| 5,113,986 | 5/1992 | Frost . |
| 5,249,661 | 10/1993 | Kawamura et al. . |
| 5,269,400 | 12/1993 | Fogelberg . |
| 5,497,867 | 3/1996 | Hirsch et al. ............... 192/53.3 X |
| 5,507,376 | 4/1996 | Skotnicki . |
| 5,544,727 | 8/1996 | Braun ......................... 192/53.3 X |
| 5,678,670 | 10/1997 | Olsson ...................... 192/53.31 X |

*Primary Examiner*—Rodney H. Bonck
*Attorney, Agent, or Firm*—James J. Dottavio

[57] ABSTRACT

A circuit for drivably connecting first and second relatively rotating members disposed for relative rotation, comprising the first relatively rotating member carrying a first spline tooth, the second relatively rotating member having a corresponding second splined tooth for engagement with the first spline tooth. A shaft rotatably supports the second member about an axis of rotation. A synchronizer is provided to synchronize the second member rotationally with respect to the first member. The first spline tooth is slideable into engagement with the second spline tooth. The spline teeth are rotationally alignable while the first spline tooth is slid into engagement with the second spline tooth. The second member is permitted to rotate relative to the shaft while the spline teeth are being aligned and while the first and second member remain frictionally synchronized.

20 Claims, 6 Drawing Sheets

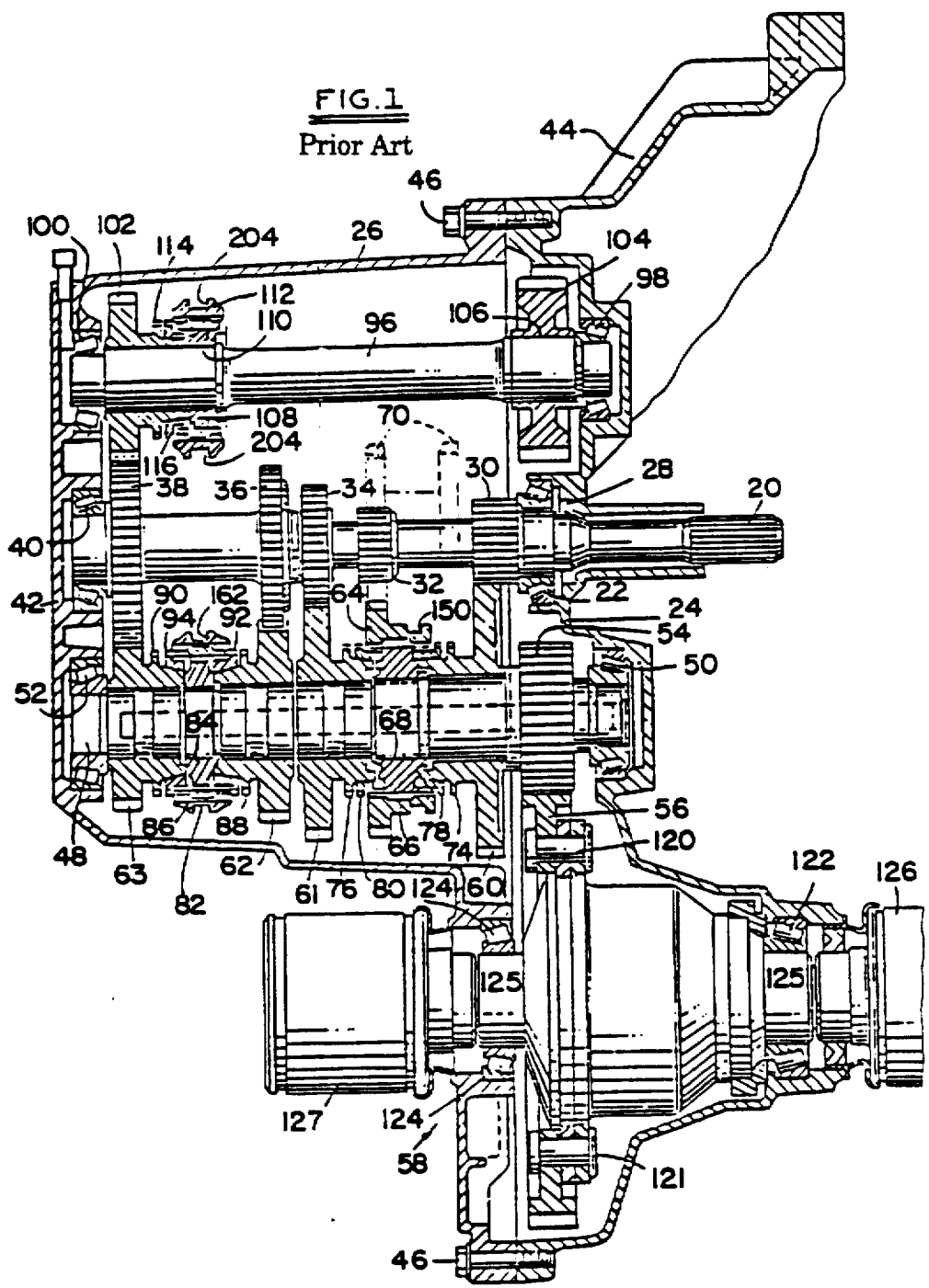

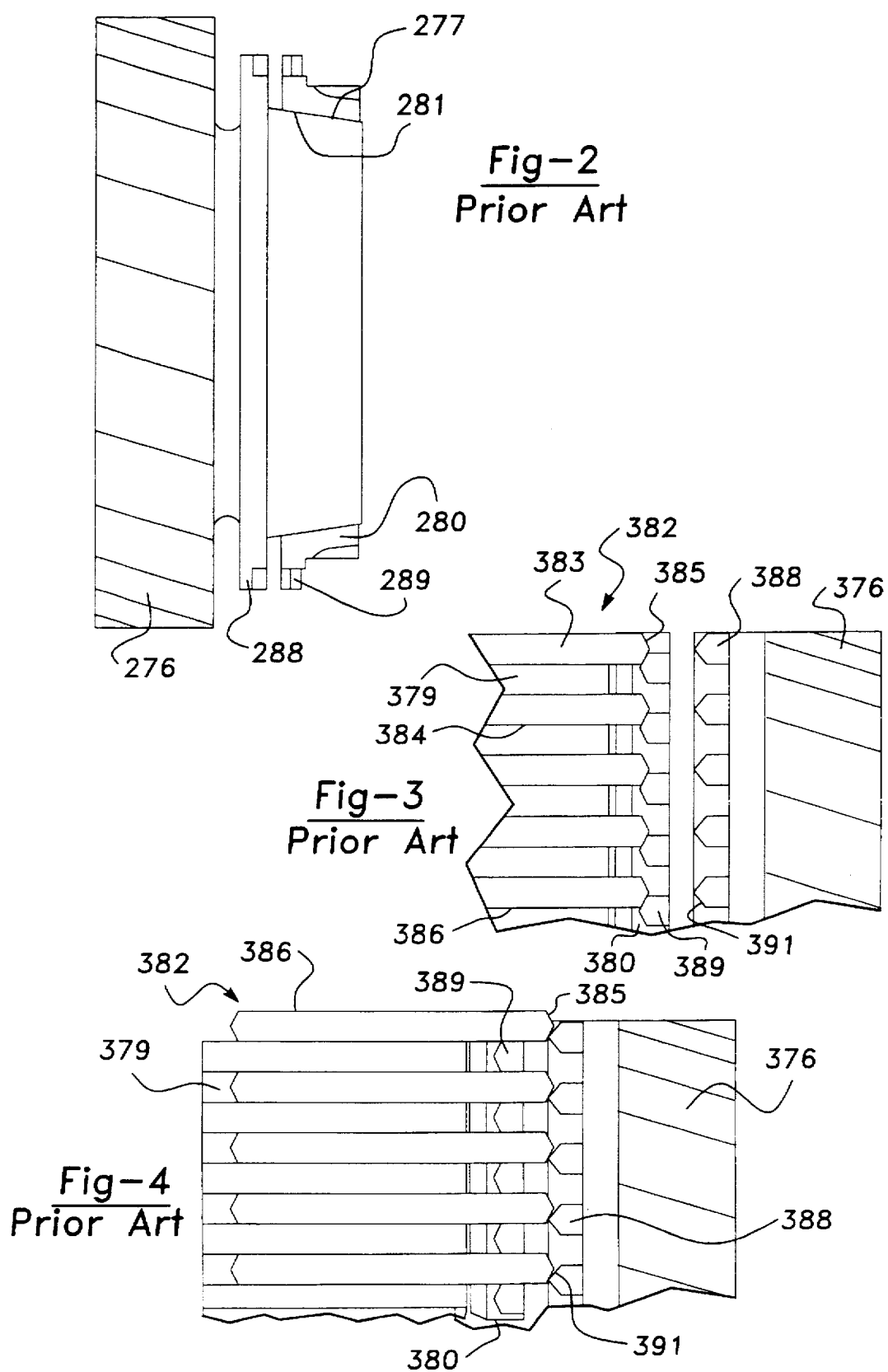

RE-INDEXING MANUAL TRANSMISSION SYNCHRONIZER

BACKGROUND OF THE INVENTION

1. Field of the Invention

This invention relates generally to the field of manually operated automotive transmissions. More particularly, this invention relates to synchronized gear shift changes in a manual transmission.

2. Description of the Prior Art

In the operation of a manually operated automotive transmission, the forward drive gears are typically fully synchronized. The driving engagement of the gears is provided using splined teeth formed on the inner surface of a synchronizer sleeve which mesh with synchronizing teeth on a gear. A blocker ring is provided between the synchronizer sleeve and the gear to provide a frictional engagement between the synchronizer sleeve and the gear to synchronize the rotation of the gear and the synchronizer sleeve prior to the engagement of the splined teeth of the synchronizer sleeve and the synchronizing teeth on the gear.

A synchronizer hub is carried on a shaft which rotatably carries the gear to be engaged. The synchronizer hub has a driving connection with the shaft and an externally splined circumference. The synchronizer sleeve has an internally splined engagement with the synchronizer hub. The blocker ring is carried by the synchronizer hub at one end thereof adjacent the gear. The end of the blocker ring opposite the hub has an internal conical surface. This internal conical surface mates with an external conical surface carried by the gear to be synchronized. The gear is carried by the shaft in a relatively rotating manner.

As the driver selects the gear to be shifted, the driver moves the shift lever in a plane which causes the synchronizer sleeve to move toward the selected gear. The internal splined teeth of the sleeve engage external splined teeth carried by the blocker ring, axially forcing the blocker ring conical surface toward the external conical surface of the gear. As the conical surfaces mate, a frictional engagement occurs, thereby bringing the synchronizer sleeve and the gear into synchronized rotation. As the synchronizer sleeve is pushed further toward the gear, the splined teeth of the sleeve bypass the external splines on the blocker ring. The sleeve splined teeth then engage external splines carried by the gear.

However, the splined teeth on the sleeve are usually not perfectly aligned with the splined teeth on the gear. A leading edge of each of the sleeve splined teeth and gear splined teeth includes a tapered portion. Thus, when the tapered portion of the sleeve splined teeth contact the tapered portion of the gear splined teeth, a normal component of the axial force from the tapered portion of the sleeve spline teeth causes relative rotation of the sleeve to the gear, thereby aligning the pairs of splined teeth. Because the splined teeth of the sleeve and the blocker ring continue to be engaged, when the gear and the sleeve rotate relatively, as described above, the blocker ring is forced to rotate with the sleeve. However, the blocker ring is also in frictional engagement with the conical surface of the gear. Therefore, as the sleeve and gear rotate relatively, the frictional connection between the blocker ring and gear must be overcome to allow the blocker ring to rotate relative to the gear so that the sleeve splined teeth may be aligned with the gear splines.

The force required to break the frictional connection between the blocker ring and the gear is felt by the operator as the shift lever is pushed further to engage the sleeve splines with the gear splines. This causes an undesirable feel because of the high effort required and the bump felt upon the break-away of the blocker ring from frictional engagement with the gear.

Therefore, it would be desirable to provide a means to align the synchronizer sleeve splined teeth with the splined teeth on the gear without having to break the frictional connection between the blocker ring and the gear.

Furthermore, the angle of the synchronizer sleeve teeth is typically optimized for synchronization, while the teeth carried by the gear have an angle which is optimized for engagement. These angles are not the same, creating an angle mismatch between the sleeve teeth and the gear teeth. This makes engagement of the synchronizer sleeve teeth and the gear teeth more difficult. It would therefore be desirable to provide sleeve teeth and gear teeth with the same angle to enable easier engagement of the synchronizer sleeve and gear.

The conical angle of the gear and blocker ring conical surfaces is typically designed to balance between shift efforts and prevention of the blocker ring sticking to the gear in conventional designs. A smaller angle provides a higher normal force between the blocker ring and the gear, which produces lower shift efforts and better protection against gear clash. However, the smaller angle increases the normal force, as mentioned above, which increases the tendency for the blocker ring to stick to the cone, creating the sticky feel and high efforts described above. When using smaller cone angles, it is also desirable to remove a stuck blocker ring from the gear when shifting out of gear without significantly increasing shift efforts.

SUMMARY OF THE INVENTION

The purpose of the present invention is to provide a synchronizer and blocker ring assembly which reduces shift efforts and improves shift feel when engaging the synchronizer sleeve with the gear. The present invention provides a blocker ring which remains frictionally engaged with the gear while the synchronizer spline teeth engage dog teeth on the gear. The lead angles on some of the splined teeth are optimized with the tooth angles on the synchronizer blocker ring for synchronization, while the lead angle on the remainder of the splined teeth are optimized for engagement with the dog teeth. The present invention also provides a means to assist in removing a stuck blocker ring from the gear so that cone angles may be minimized. The present invention further provides a means for rotationally aligning the blocker ring and synchronizer sleeve upon disengagement of the synchronizer.

The advantages of the present invention includes a simplified synchronizer assembly which provides improved shift feel and efforts.

In realizing these objects and advantages, a synchronizer assembly is provided comprising a first relatively rotating member carrying a first spline tooth, and a second relatively rotating member having a corresponding second splined tooth for engagement with the first spline tooth. A shaft rotatably supports the second member about an axis of rotation. A synchronizer is provided to synchronize the second member rotationally with respect to the first member. The first spline tooth is slideable into engagement with the second spline tooth. The spline teeth are rotationally alignable while the first spline tooth is slid into engagement with the second spline tooth. The second member is permitted to rotate relative to the shaft while the spline teeth are being aligned and while the first and second member remain frictionally synchronized.

BRIEF DESCRIPTION OF THE DRAWINGS

Other advantages and features of the synchronizer of the present invention will be apparent to those skilled in the art upon reading the following description with reference to the accompanying drawings, in which:

FIG. 1 is cross-sectional side view of a transmission;

FIG. 2 is a partial sectional side view showing he engagement of a clutch blocker ring and a gear;

FIGS. 3–5 are partial cross-sectional side views showing a prior art synchronizer assembly;

DESCRIPTION OF THE PREFERRED EMBODIMENTS

Figure 5:
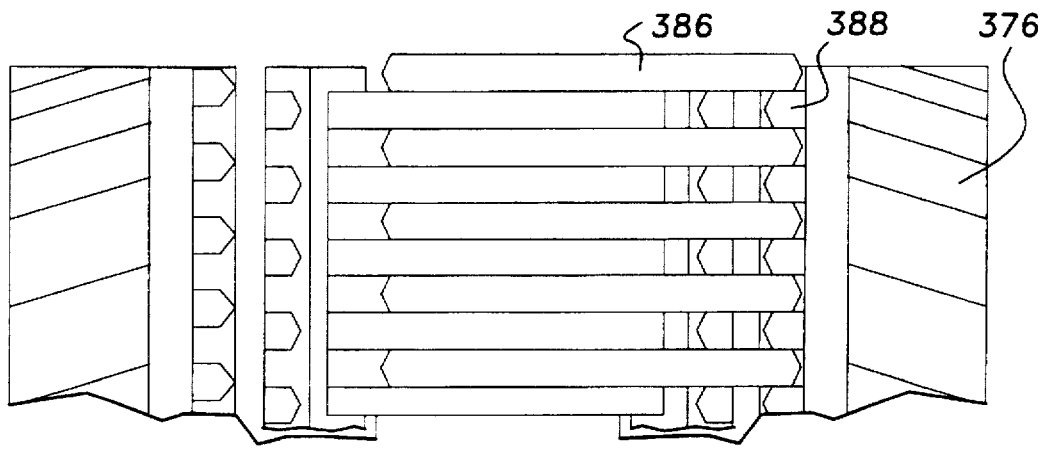

Referring first to prior art FIG. 1, an input shaft assembly 20 is journalled in a bearing 22 mounted in the support wall 24 of the transmission housing 26. The shaft seal 28, located in an annular recess formed in the support wall 24, seals the outer periphery of shaft 20.

Formed on or carried by shaft 20 are five torque input gears, shown respectively at 30, 32, 34, 36 and 38. These gears form torque delivery paths during operation in low speed ratio, reverse, second speed ratio, third speed ratio, and fourth speed ratio, respectively. Drive gear 38 further operates to provide a portion of the torque delivery path for the fifth speed ratio. The left end of the input shaft is journalled by bearing 40 in a bearing opening formed in the end wall 42 of the housing 26. The right-hand end of the housing is bolted to the left-hand end of the clutch housing 44, as indicated by the attachment bolt 46.

A countershaft 48 is journalled at one axial end in bearing 50, which is received in a recess formed in wall 24 and at the opposite end in bearing 52, which is received in a recess formed in the end wall 42. Output gear 54 is fixed to or integrally formed with countershaft 48 and meshes with the output gear 56, which drives a differential gear assembly designated generally by the reference character 58. The countershaft supports pinions 60, 61, 62, and 63, each forming a part of the torque delivery paths for low speed ratio, second speed ratio, third speed ratio and fourth speed ratio. The pinions are journalled on the outer surface of the countershaft.

A reverse gear 64 is formed integrally with the sleeve of synchronizer clutch 66, which is splined at 68 to the countershaft 48. A reverse drive idler 70, which moves between the extremities of its range shown in FIG. 1, meshes with the teeth of the reverse input gear 32 and the reverse pinion 64 when it is moved into alignment with those gears.

Reverse gear 64 has internal clutch teeth adapted to engage dog teeth 74, 76 formed respectively on the hubs of output gear wheels 60 and 61. Synchronizer blocker rings 78, 80 act to synchronize the speed of the reverse gear 64 with the speed of pinions 60 or 61 before engaging the associated dog teeth of the pinion. In this way, the pinions are drivably connected through the synchronizer hub to countershaft 48.

As shown in FIG. 2, the synchronizer ring 280 includes an annular internal surface 281, which frictionally engages a complementary surface 277 carried by the gear 276. Upon axial movement of the synchronizer ring 280, the surfaces 277, 281 are frictionally engaged, bringing the synchronizer ring 280 and gear 276 into synchronous rotation. The surfaces 277, 281 include a tapered cone angle, which promotes engagement upon relative axial movement and enables a frictional lockup therebetween. In the present description, the cone angle is defined as the angle from the axis of rotation for one of the surfaces, as shown in the attached Figures. It is advantageous to provide frictional surfaces which are nearly parallel to the axis of rotation to minimize the force required to engage the surfaces.

However, synchronizers having a cone angle where each surface 277, 281 is angled from the axis of rotation less than approximately six degrees have been found to stick excessively upon engagement due to hoop stress in the synchronizer ring 280, creating a radial force which keeps the synchronizer ring 280 engaged with the gear 276. This sticking creates problems during shifting because when the ring 280 and gear 276 are initially synchronized, the lugs 289 carried by the ring 280 and the dog teeth 288 carried by the gear 276 are usually not properly aligned for the internal splines of the synchronizer sleeve (not shown in FIG. 2) to engage both the lugs 289 and the dog teeth 288.

Therefore, the synchronizer ring 280 and gear 276 must rotate relatively to align the splines on the sleeve with the teeth 288 on the gear 276. The frictional engagement of surfaces 277, 281 must be broken to permit this alignment. This may make the shift impossible, due to the high effort necessary to break the engagement of the surfaces 277, 281, or the shift feel may be unacceptable to the driver due to the breakaway, giving a notchy feel to the shift due to the double detent the driver feels when breaking the friction surfaces and engaging the spline teeth. A large angle permits easier breakaway, and thus relative rotation between the ring 280 and gear 276. However, such a large angle may result in unacceptable noise during shift because of clashing between the splines and teeth 288 when the ring 280 slips during a shift.

Referring back to FIG. 1, when the reverse idler is aligned with gear 32 and reverse pinion 64, a reverse torque delivery path is completed between the input shaft 20 and the output gear 54. When operating the transmission in any ratio except reverse ratio, reverse idler 70 is located at the right-hand end of its range of motion.

A three-four synchronizer clutch 82 is splined at 84 to countershaft 48 and carries external splines on which an internally splined clutch sleeve 86 is slidably mounted. Sleeve 86 has internal clutch teeth adapted to engage dog teeth 88, 90 formed respectively on the hubs of pinions 62 and 63. The synchronizer clutch synchronizer rings 92, 94, located between hub 82 and pinions 62, 63, establish speed synchronism between the countershaft and the selected gear in accordance with the direction that clutch sleeve 86 is moved.

An auxiliary countershaft 96 is rotatably supported by bearings 98 and 100 on the walls of the clutch housing and transmission casing, respectively. The fifth speed ratio pinion 102 is journalled on the outer surface of countershaft 96 and is in continuous meshing engagement with input gear 38, as is fourth speed pinion 63. A fifth speed output gear 104 is splined at 106 to countershaft 96 and is in continuous meshing engagement with output gear 56. Located between pinion 102 and gear 104, a third synchronizer clutch hub 108 is splined at 110 to the countershaft. The hub has external splines 111 on which an internally splined clutch sleeve 112 is mounted. The sleeve is formed with internal clutch teeth 113 adapted to engage external dog teeth 114 on the hub of the fifth speed pinion 102. A synchronizer blocker ring 116, located between the dog teeth and the clutch hub, establishes synchronism between countershaft 96 and pinion 102.

The differential gear assembly 58 includes output gear 56, which is riveted to a flange formed on the differential assembly at 120, 121. The differential is journalled at one end by the bearing 122, which is received in an annular recess formed in the end wall 24, and at the opposite axial end by the bearing 124, which is received in an annular recess formed in the transmission housing 26. Bevel gears mounted on the driveshafts transmit engine torque to each of two constant velocity universal joints 126, 127, through which power is transmitted to each of the forward wheels of the vehicle.

Referring now to FIGS. 3-5, a prior art synchronizer clutch assembly 382 is shown in partial sectional view in various stages of engagement. Identical features of the assembly, shown in FIGS. 3-5, keep the same reference numbers throughout FIGS. 3-5. The assembly 382 includes a synchronizer hub 379 having a splined engagement 384 with a synchronizer sleeve 386. The synchronizer sleeve 386 includes spline teeth 383 having a lead angle 385, which engages the lugs 389 on the synchronizer ring 380 and the dog teeth 388 on the gear 376. The lead angle 385 on the spline teeth 383 is typically complementary to the lead angle on the lugs 389.

The lead angle 385 is typically optimized for sliding the synchronizer ring 380 axially into frictional engagement with the gear 376, and not optimized for rotation of the ring 380 for engagement. The dog teeth 388 have a lead angle 391 which is typically optimized for engagement. The above optimization requires an optimization of the frictional balance considerations in the torque balance between the cone torque and the indexing torque to align the splines to the teeth. In a preferred embodiment, a ratio of the cone torque to the index torque is approximately 1.2:1.5. The torque balance is influenced by the cone angle and the pitch diameter of the sleeve, and the lead angles of the teeth.

Thus, as shown in FIG. 4, when the splines 383 slide past the lugs 389 and engage the dog teeth 388, the angles 385 and 391 are not optimized for smooth engagement. As the sleeve 386 is pushed further rightwardly, as shown in FIG. 4, the spline teeth 383 are levered between the lead angle 391 of the dog teeth 388 and the lugs 389. This leverage causes the gear 376 and synchronizer ring 380 to rotate relatively when the frictional engagement therebetween is overcome. As the gear 376 rotates relative to the ring 380, the lugs 389 align with the dog teeth 388 so that the splines are able to slide axially between the dog teeth 388, as shown in FIG. 5.

Depending upon the configuration of the transmission, either the synchronizer 382 may drive the gear 376 or the gear 376 may drive the synchronizer. As shown in FIG. 1, the gears 60-63 and 102 are driven by the input shaft 20, so the synchronizers 66, 86 and 112 are driven by the gears. Therefore, referring to FIG. 4, the rotation imparted by the leverage on the spline teeth 383 will produce rotation of the locked ring 380 and gear 376 relative to the synchronizer sleeve 386.

Alternatively, one skilled in the art recognizes that in a design where the synchronizer is carried by the transmission input shaft (not shown), the driving synchronizer will rotate relative to the locked gear and synchronizer ring.

Figure 8:
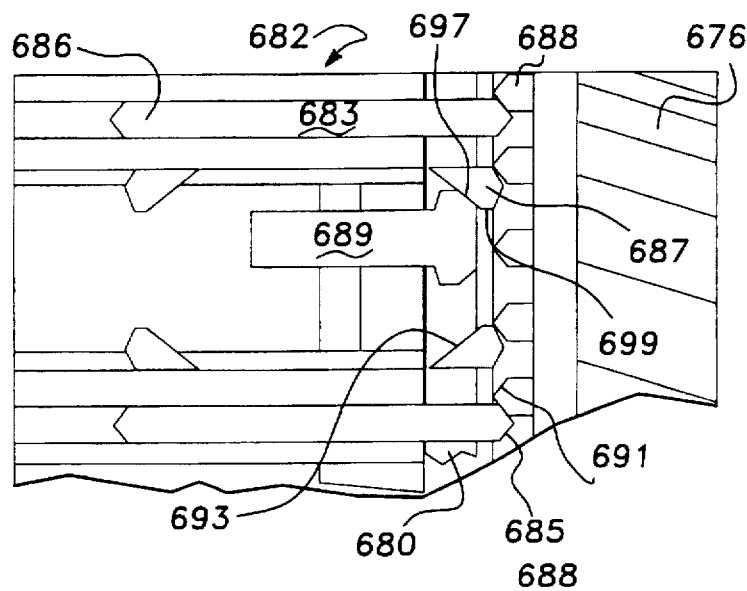
Figure 9:
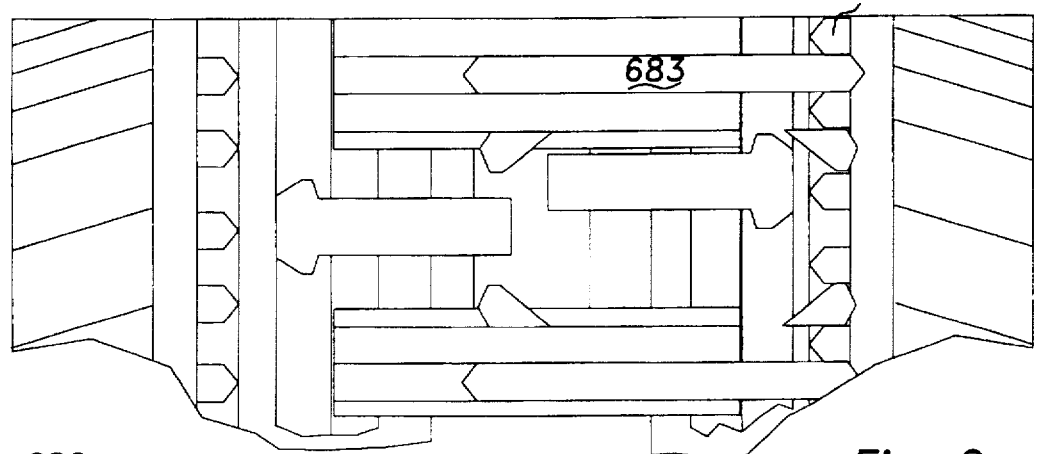
Figure 10:
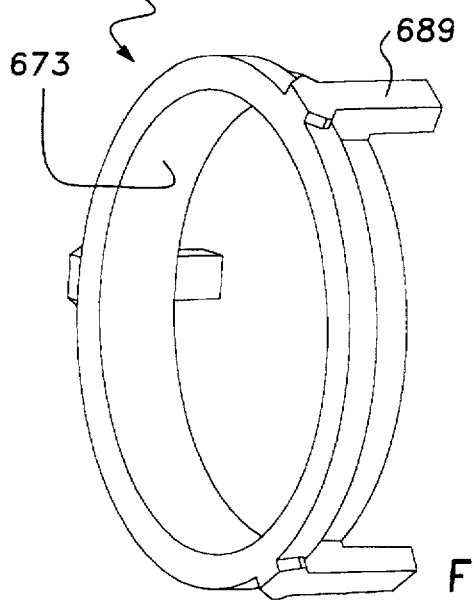
FIG. 10 is an isometric view of a blocker ring shown in FIGS. 6–9.

As shown in FIGS. 6-9, a preferred embodiment of a synchronizer according to the present invention is shown in various stages of engagement. Features of the assembly are referred to with the same reference numbers throughout FIGS. 6-9. The synchronizer 682 of the present invention includes a synchronizer sleeve 686 having a plurality of circumferentially-spaced splines 683, which drivably engage corresponding splines carried by the clutch hub 679. At preferably three locations circumferentially spaced about the sleeve 686, one spline is removed and the two splines 687 circumferentially spaced adjacent the removed spline are modified, as described below and shown in FIGS. 6-9. As shown in FIG. 10, a preferred synchronizer ring 680 according to the present invention includes three lugs 689, which are spaced in registration with the removed splines and positioned between each pair of modified splines 687.

Figure 6:
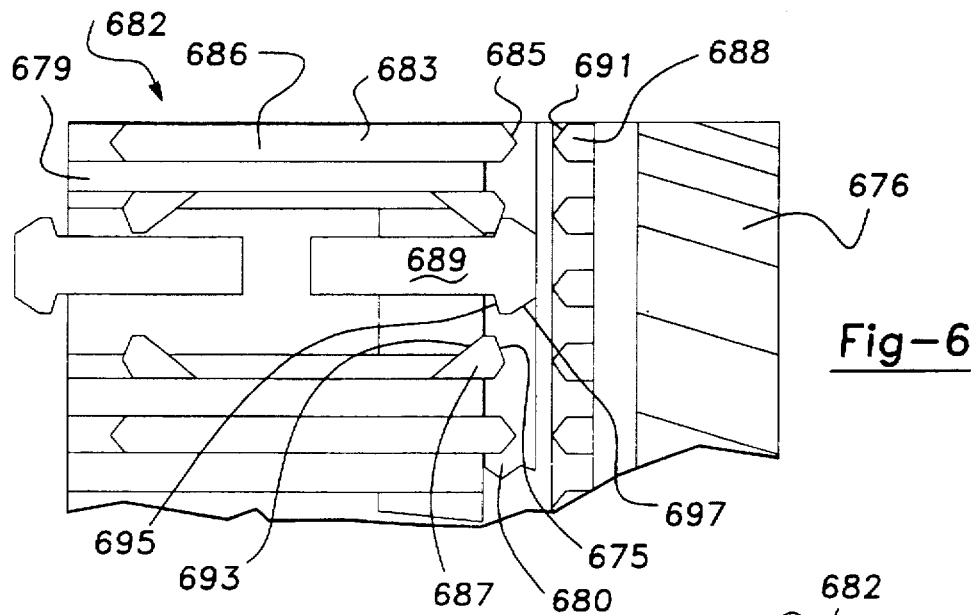
FIGS. 6–9 are partial cross-sectional side views showing a synchronizer assembly according to the resent invention.

The modified splines 687 have a shorter length and therefore do not project as far axially toward the gear 676 as the remainder of the splines 683. The modified splines 687 also preferably do not extend across the width of the sleeve 686, but have a notched portion where a portion of the spline is removed so that the remaining portion of the modified spline has a back face angle 693 at an interior position. The notch may continue through the entire width of the spline, as shown in FIG. 6, or the notch may only extend far enough to permit adequate relative rotation between the synchronizer sleeve 386 and the frictionally engaged ring 380 and gear 376, as described below.

The back face angle 693 and removed portion of the modified splines 687 provide for rotational clearance between the lugs 689 and the modified splines 687 so that the back face angle 693 is able to slide axially past the lugs 689 while they rotate relatively. The back angle 693 preferably is equal to the lead angle 691 of the dog teeth, or flatter, so the lugs 689 may pass by the back side of the modified splines 697 while the splines 693 are aligned with the dog teeth 688. It is also preferred that the lugs 689 are long enough so that when a gear 676 is engaged on one side, as shown in FIG. 9, the opposite lug 689 is aligned between the modified lugs 687 to keep the synchronizing ring 680 opposite the gear 676 in rotational alignment with the synchronizer sleeve 686 so that the synchronizer functions properly when the opposite gear 676 is engaged.

Figure 7:
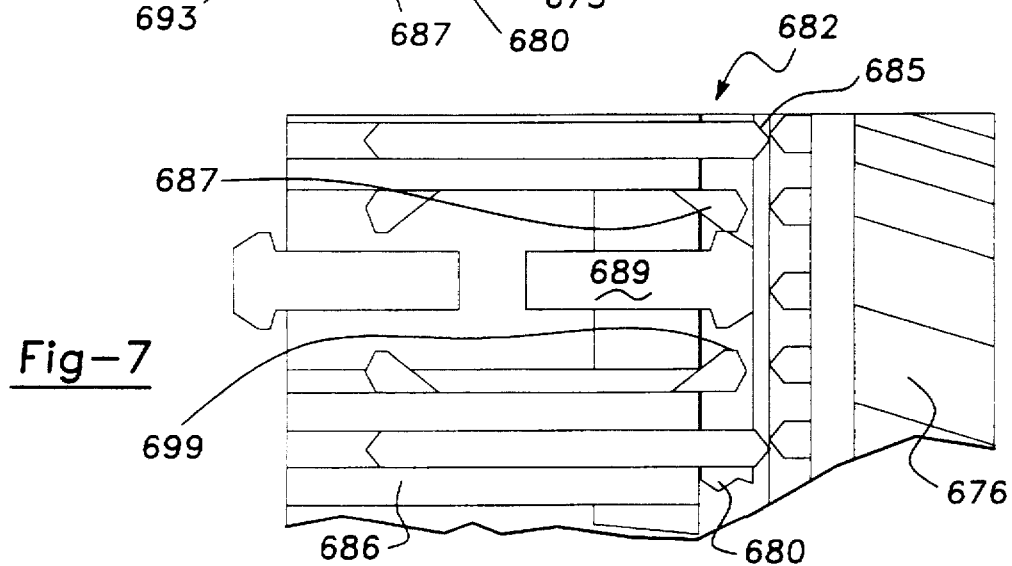

During a gear shift, the synchronizer sleeve 686 is forced axially until the lead angle 675 of the modified splines 687 engages the back angle 695 of the lugs 689. These angles 675, 695 are preferably used only for axially forcing the ring 680 into synchronization and may be optimized therefor without concern of engagement, as described above. Axial movement of the sleeve 686 forces the ring 680 into frictional engagement with the gear 676. As the gear 676 and ring 680 are synchronized, further axial movement of the sleeve 686, as shown in FIG. 7, forces the modified spline 687 past the back angle 695 of the lugs 689, permitting the sleeve 686 and ring 680 to rotate relatively.

As the sleeve 686 is moved further axially, as shown in FIG. 8, the flat portion 699 of the modified spline 687 passes the lug 689. At this point, the unmodified splines 683 engage the dog teeth 688 of the gear 676. Because the alignment of the splines 683 between the dog teeth 688 is fortuitous, as described above, further relative rotation of the sleeve 686 and the gear 676 is likely upon engagement of the lead angle 685 of the splines 683 with the lead angle 691 of the dog teeth 688 due to any misalignment between the splines 683 between the dog teeth 688. Relative rotation may be required in either direction to align the splines 683 between the dog teeth 688. Therefore, the back angle 693 of the modified splines 687 may continue to engage the front angle 697 of the lugs 689, but the engagement between the splines 683 and the dog teeth 688 may result in rotation, which precludes such further engagement. The clearance between the lugs 689 and the modified splines 687 provided by the notches and back angles 693, 697 thus enables rotation between the ring 680 and sleeve 686 without breaking the frictional engagement between the ring 680 and gear 676. Full engagement of the splines 683 and dog teeth 688 is shown in FIG. 9.

The lead angles 685 of the unmodified spline teeth 683 are optimized for engagement with the lead angle 691 of the dog teeth 688. Therefore, these angles 683 are preferably not the same as the angle 697 of the modified teeth 687, which are optimized for synchronization as described above. Because the sleeve 686 and ring 680 are able to rotate relatively, the frictional engagement between the ring 680 and gear 676 need not be broken to complete the shift, and the conical angle between the gear 676 and sleeve 680 may be minimized as described above.

Disengagement of the ring 680 and gear 676 is produced by moving the sleeve 686 in the opposite direction it was moved to engage the gear. Initially, the disengagement force is provided by the detent 669 of the spring 667 against the bump 671 carried by the lug 689, or by the back angle 693 of the modified splines 687 contacting the front angle 697 of the lugs, as shown in FIG. 8. These forces provide for disengagement of the ring 680 and gear 676, while the angles 693, 697 ensure the lugs 689 are properly aligned between the modified splines 687 after the synchronizer 682 is disengaged from the gear 676. The axial movement of the sleeve 676 thus pulls the ring 680 away from the gear 676 back to a neutral position and aligns the sleeve 676 and ring 680. The disengagement action described above is desirable to overcome any greater engagement force between the ring 680 and gear 676 due to the lesser conical angle of the frictional surfaces described above and illustrated for the ring 680 at 673 in FIG. 10.

A synchronizer according to the present invention is particularly useful for reverse gear, as reverse is often selected when the vehicle is at rest and the clutch is not engaged so the transmission shafts are not rotating. Therefore, during engagement of the ring 680 and gear 676, both the ring 680 and gear 676 may not be rotating. Without rotation, alignment of a prior art device made full engagement of a synchronized reverse gear difficult. The relative rotation enabled by the present invention therefore simplifies the full synchronization of reverse gear. Furthermore, disengagement of reverse gear also usually occurs with the vehicle at rest. It is therefore easier to break away the reverse synchronizer ring 680 and a smaller angle may be used between the ring 680 and gear 676. In a preferred embodiment, the forward synchronizer rings have a cone angle of six degrees and the reverse cone has an angle smaller than six degrees.

Figure 11:
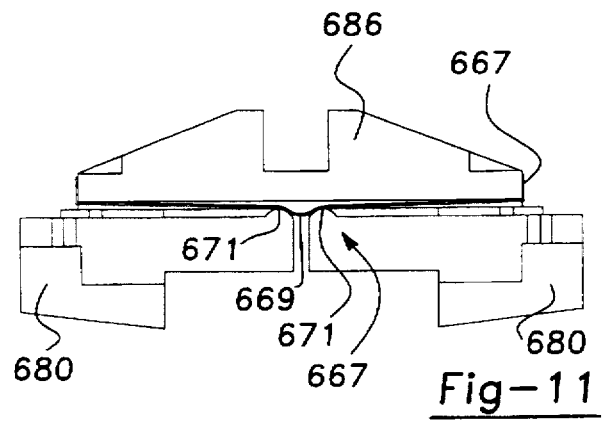
FIG. 11 is a partial sectional view of a synchronizer assembly according to the present invention.

A further improvement enabled by the present invention includes the simplification of the mechanism used to provide a breakaway load to the synchronizer blocker rings shown in FIGS. 6–9. As shown in FIG. 11, this device includes a spring 667 carried by the synchronizer sleeve 686. The spring 667 is preferably retained to the sleeve 686 by snapping the spring over each end of the sleeve 686, as shown in FIG. 11. Alternatively, the spring 667 is retained at a first end to the sleeve 686 through an interference fit or through a mechanical attachment (not shown). At the second end of the spring 667 there is provided a detent 669. Each synchronizer ring 680 has a bump 671 adjacent the detent 669. Thus, when the sleeve 686 moves axially, the spring detent 669 first engages the bump 671, before the modified spline teeth 687 engage the lugs 689, to provoke movement of the ring 680, as shown in FIGS. 6–9. The spring 667 then deflects toward the sleeve 686 and the detent 669 is overcome. Alternatively, the bump 671 may be deleted and the spring detent 669 engages the back end of the ring 680 adjacent where the bump 671 is shown.

Figure 12:
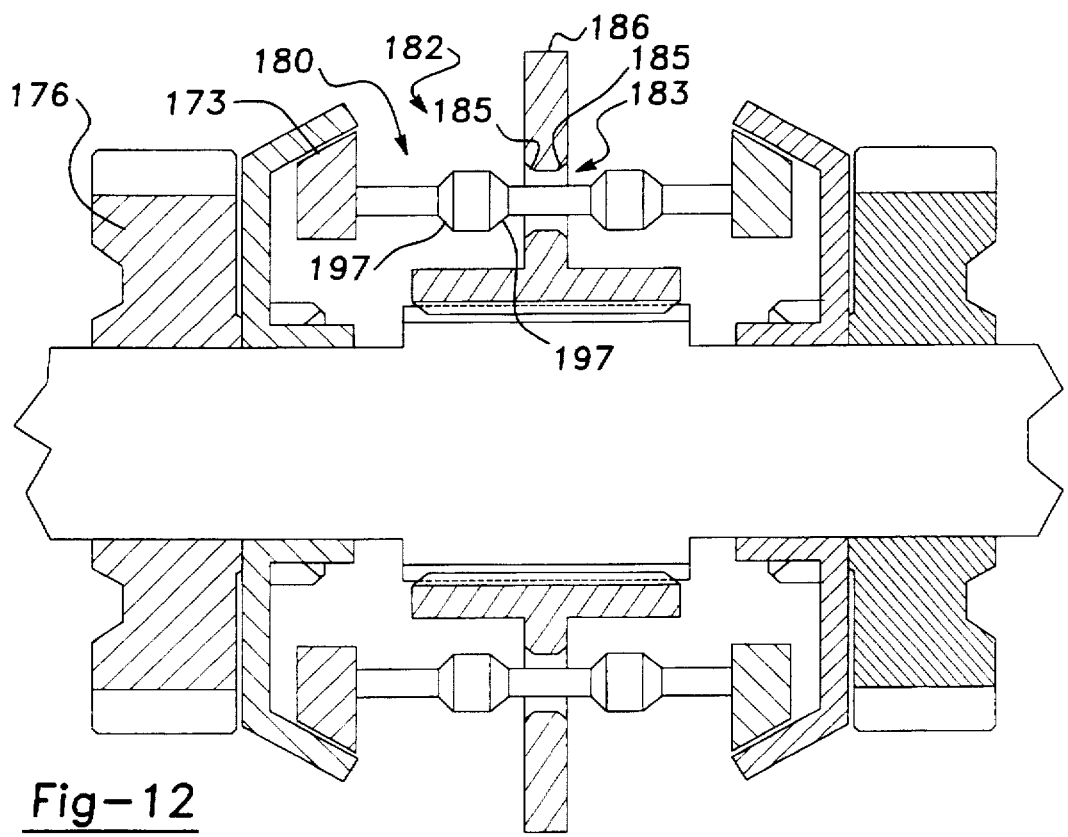
FIGS. 12–14 are partial cross sectional views of an alternative embodiment of a synchronizer assembly according to the present invention.
Figure 13:
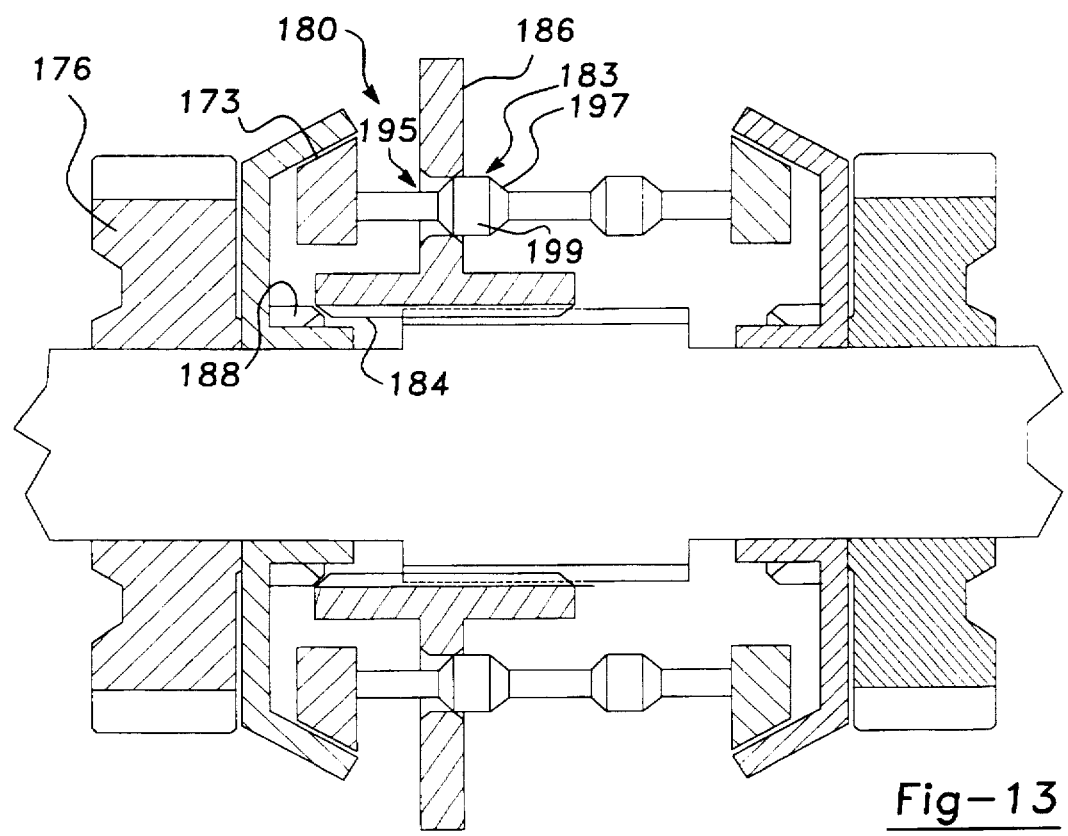
Figure 14:
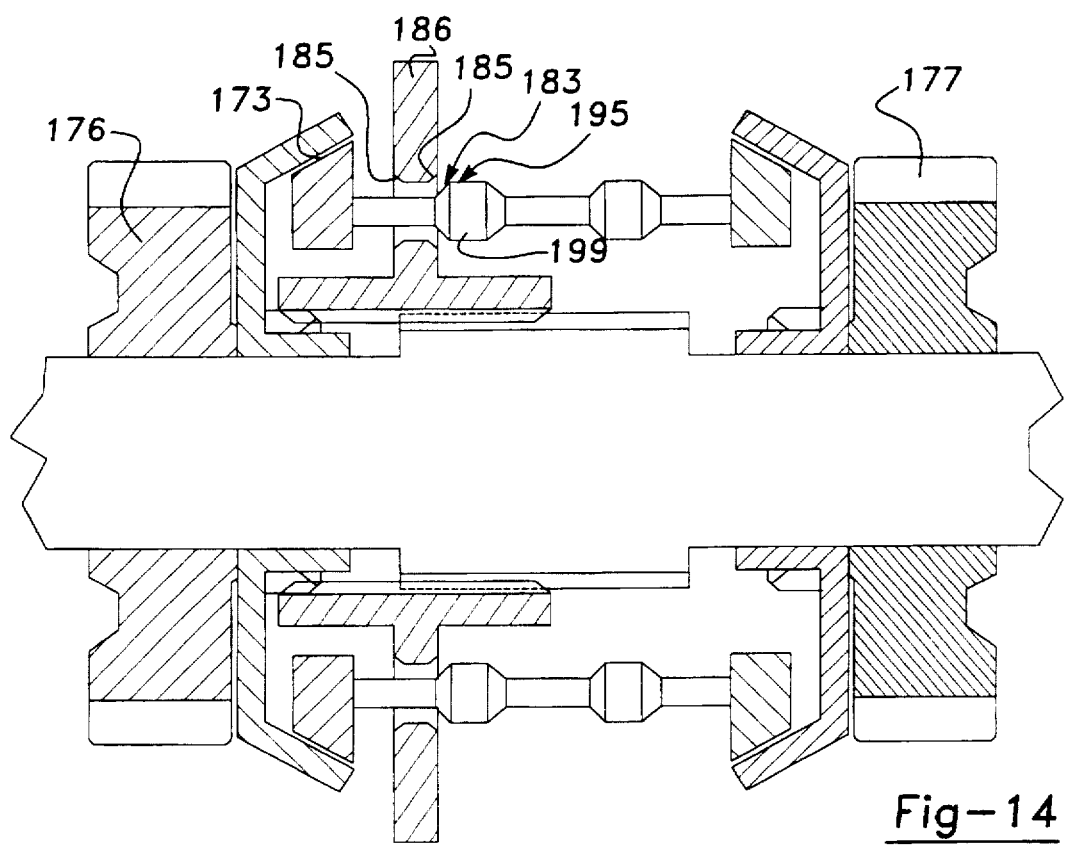

An alternative embodiment of a synchronizer assembly according to the present invention is shown in FIGS. 12–14, which show a partial sectional side view of an alternative synchronizer assembly. This embodiment utilizes the concepts described above with a pin-type synchronizer assembly 182. A pin assembly 180 carries a conical frictional surface 173 for engagement with a gear 176. The pin assembly 180 projects through an aperture 183 in a synchronizer sleeve 186. The aperture preferably includes ramped surfaces 185 complimentary to ramped surfaces 197 provided on the pin assembly 180. When the sleeve 186 is moved axially, a ramped surface 185 engages a corresponding ramped surface 197 on the pin 180, and the pin 180 moves axially with the sleeve 186 until the frictional surface 173 engages the gear 176, as shown in FIG. 12. The sleeve 186 is moved further axially and overcomes the ramped surface 197, causing the pin assembly 180 and sleeve 186 to rotate relatively when the ramped surface 197 is overcome, as shown in FIG. 13.

Further axial movement of the sleeve 186 causes the aperture 183 to pass down a second ramped surface 199 to a reduced portion 195 of the pin 180, as shown in FIG. 13, thereby enabling further relative rotation between the sleeve 186 and pin assembly 180. The internal splines 184 engage the dog teeth 188 provided on the gear 176 in a manner similar to that described above with reference to FIGS. 6–9. When the sleeve 186 reaches the reduced portion 180, the sleeve 186 internal spline teeth 184 are just about to engage the dog teeth 188 carried by the gear 176. The spline teeth 184 carry a lead angle which is optimized to engage a lead angle on the dog teeth 188, as described above with reference to FIGS. 6–9. The engagement of the lead angles produces a resultant rotational force, which causes relative rotation of the sleeve 186 to the gear 176 to align the splines 184 between the dog teeth 188. The reduced section 195 provides clearance between the pin 180 and the aperture 183, thereby enabling relative rotation of the sleeve 186 to the pin assembly 180 without disengaging the friction surface 173 from the gear 176. FIG. 14 illustrates engagement between the sleeve 186 and the gear 176.

Disengagement of the clutch surface 173 is accomplished upon axial movement of the sleeve 186 in an opposite direction. The opposite motion forces the ramped surface 185 on the opposite side of the aperture 183 to engage a complementary ramped surface 199 on the pin 180, thereby moving the pin assembly 180 in the opposite direction therewith. This engagement of the ramped surfaces 185, 199 is maintained until the sleeve 186 reaches a neutral position, similar to that shown in FIG. 12, or such engagement may be maintained through the engagement of a gear 177 on the opposite side of the sleeve 186, as would be appreciated by one skilled in the art.

Figure 15:
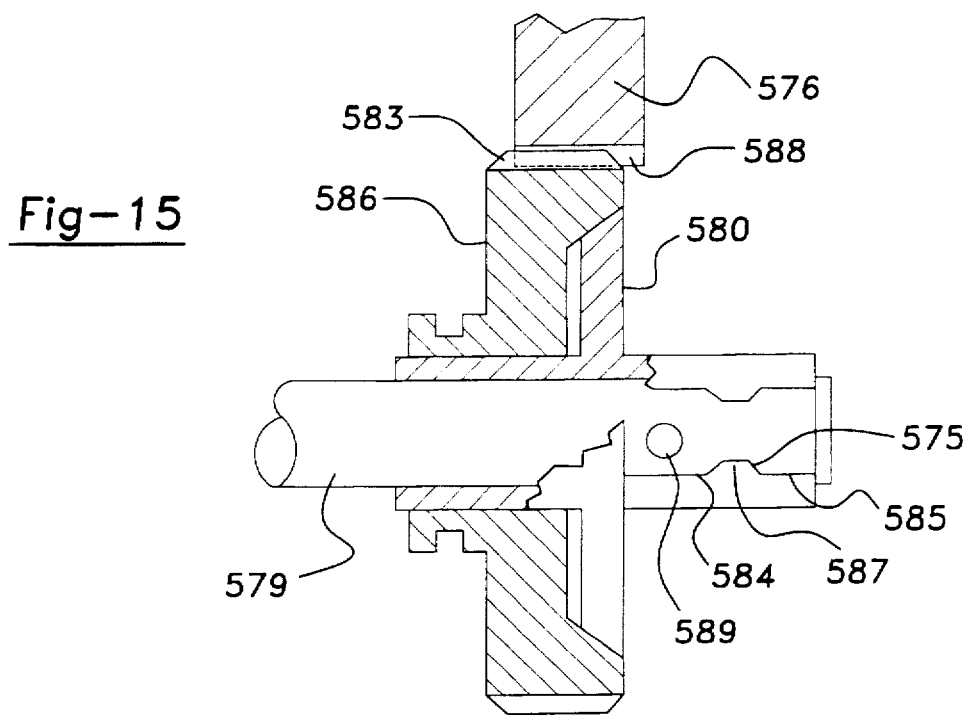
FIG. 15 is a partial sectional view of an alternative embodiment of a synchronizer assembly according to the present invention.

A further embodiment of a synchronizer assembly according to the present invention is illustrated in FIG. 15. In this embodiment, a shaft 579 is fixed to a transmission case (not shown). A gear 576 is nonrotatably supported by the case (not shown). A second gear 586 is rotatably supported by the shaft 579 and a synchronizing sleeve 580. As second gear 586 is slid rightwardly, as viewed in FIG. 15, the second gear 586 frictionally engages the sleeve 580. The sleeve is prevented from rotating by a pin 589 which contacts a cam surface 585. The second gear 586 is therefore also frictionally braked by the sleeve 580. As the gear is pushed further rightwardly, a circumferentially extending projection 587 on the cammed surface 585 of the sleeve 580 causes the frictionally engaged sleeve 580 and the second gear 586 to rotate while the pin 589 is forced over an angled surface 575 provided on the projection 587. As the teeth 583 on the second gear 586 are forced into engagement with teeth 588 provided on the gear 576, rotational alignment is unlikely, as described above. A lead angle (not shown) is provided on the gear teeth 583, 588 similar to the tooth angles on the splines 683 and dog teeth 688 shown in FIGS. 6–9. Thus, the lead angles (not shown) force the second gear 586 to rotate relative to gear 576 to align the teeth 583, 588. The detent 587 does not extend at this point 583, thereby permitting relative rotation of the gears 586, 576 and relative axial movement thereof.

The embodiment shown in FIG. 15 is used in a reverse gear where gear 586 is braked. In reverse, since the gear rotates in only one direction, only one detent is required (although two are shown in FIG. 15). The design illustrated in FIG. 15, which uses a cammed surface on a sleeve provided on the gear 586, or clutch sleeve 580 may be extended by one skilled in the art to provide driving engagement in other applications.

In a further alternative embodiment, similar to that shown in FIGS. 6–9, but not illustrated here, the synchronizer sleeve carries an internal projection which engages a female slot on the external surface of the synchronizer blocker ring. One skilled in the art recognizes that, in this embodiment, the projection has a first surface with angular engagement with a slot in the synchronizer blocker ring having complementary angled surfaces. The female slot provides for sliding engagement between the sleeve and the blocker ring until the blocker ring is frictionally engaged with the gear. At this point, the female slot opens circumferentially so that when the synchronizer teeth on the sleeve engage the gear, the sleeve is able to rotate relative to the frictionally engaged pair of the blocker ring and gear. Thus, any further relative axial movement between the sleeve and blocker ring does not produce a rotational engagement therebetween.

The forms of the invention shown and described herein constitute the preferred embodiments of the invention; they are not intended to illustrate all possible forms thereof. The words used are words of description rather than of limitation, and various changes may be made from that which is described here without departing from the spirit and scope of the invention.

I claim:

1. A clutch for drivably connecting first and second relatively rotating members disposed for relative rotation, the clutch comprising:

the first relatively rotating member carrying a first spline tooth;

the second relatively rotating member having a corresponding second splined tooth for engagement with the first spline tooth;

a shaft for rotatably supporting the second member about an axis of rotation;

means for frictionally synchronizing the second member rotationally with respect to the first member;

means for sliding the second spline tooth into engagement with the first spline tooth;

means for rotatably aligning the spline teeth while the second spline tooth is slid into engagement with the first spline tooth; and means for permitting relative rotation of the second member to the shaft while the spline teeth are being aligned and while the first and second members remain frictionally synchronized.

2. A clutch according to claim 1, wherein said first and second rotating members are disposed for relative rotation about a concentric axis and said means for frictionally synchronizing the first and second members comprises:

said first rotating member carrying a first friction surface and said first spline tooth comprises a plurality of gear clutching teeth;

said shaft having a splined external surface; and said second member comprising a synchronizer sleeve in splined engagement with said shaft, the sleeve second spline tooth comprising a plurality of circumferentially spaced spline teeth in registration with the gear clutching teeth of the first rotating member for drivable engagement therewith, and a synchronizing ring provided between the synchronizer sleeve and the first rotating member, said ring having a second frictional surface complimentary to and adjacent the first friction surface of the first rotating member.

3. A clutch according to claim 2, wherein the means for axially mutually slidably engaging the synchronizer sleeve and the synchronizing ring comprises:

at least one of said sleeve spline teeth comprising a modified spline tooth having a circumferential spacing at least approximately twice the distance to the next adjacent spline tooth and a lead angle provided at a first end of said modified spline tooth; and said synchronizing ring comprising a projection mutually slidably engagable with the lead angle of said modified spline tooth when said sleeve is moved in a first axial direction.

4. A clutch according to claim 3, wherein the means for permitting relative rotation and axial movement between the synchronizing ring and the synchronizer sleeve to align the sleeve spline teeth with the gear clutching teeth while maintaining frictional engagement between the synchronizing ring and the first rotating member comprises said modified spline tooth having a notch for permitting relative rotation between the synchronizer sleeve and the synchronizer ring when the projection moves adjacent the notch of the modified spline tooth.

5. A clutch according to claim 4, wherein the projection is positioned adjacent the notch when a second of said sleeve spline teeth engages a gear clutching tooth.

6. A clutch according to claim 5, wherein the second sleeve spline tooth has a first axial length and said modified spline tooth has a second length shorter than the first length.

7. A clutch according to claim 6, wherein the gear clutching teeth and said sleeve second spline tooth have a first lead angle optimized for engagement therebetween and said modified spline tooth has a second lead angle optimized for synchronization.

8. A clutch according to claim 7, wherein the lead angles of the teeth result in a cone torque to indexing torque ratio of approximately 1.2:1.5.

9. A clutch according to claim 8, wherein the first and second friction surfaces are inclined to the axis at a cone angle which is less than approximately six degrees.

10. A clutch according to claim 9, wherein the sleeve spline teeth comprise internal spline teeth and the ring projections comprise external lugs.

11. A clutch according to claim 10, further comprising a means for disengaging the frictional surfaces when said sleeve is moved in a second axial direction.

12. A clutch according to claim 11 wherein the means for disengaging the frictional surfaces comprises a detent provided on said lug adjacent the notch on said modified spline tooth.

13. A clutch according to claim 11 wherein the means for disengaging the frictional surfaces comprises a leaf spring carried by the sleeve adjacent the lug.

14. A clutch according to claim 4, wherein the means for axially mutually slidably engaging the synchronizer sleeve and the synchronizing ring comprises:

said synchronizer sleeve having an annular portion projecting radially therefrom with an axial aperture formed therein;

said synchronizing ring carrying a pin axially projecting through said aperture, said pin having a first ramped surface for mutual slideable engagement with the sleeve.

15. A clutch according to claim 14, wherein the means for permitting relative rotation and axial movement between the synchronizing ring and the synchronizer sleeve to align the spline teeth with the gear clutching teeth while maintaining frictional engagement between the synchronizing ring and the first rotating member comprises said pin having a reduced portion for permitting relative rotation between the synchronizer sleeve and the synchronizer ring when the reduced portion is within the aperture.

16. A clutch according to claim 15, wherein the reduced portion is positioned within the aperture when one of said sleeve spline teeth engages a gear clutching tooth.

17. A clutch according to claim 16, wherein the first and second friction surfaces are inclined to the axis at a cone angle which is less than approximately six degrees.

18. A clutch according to claim 17, further comprising a means for disengaging the frictional surfaces when said sleeve is moved in a second axial direction.

19. A clutch according to claim 18 wherein the means for disengaging the frictional surfaces comprises a second ramped surface provided on said pin.

20. A clutch according to claim 1, wherein the means for frictionally engaging the second member to the first member and the means for permitting relative rotation of the second member to the shaft while the spline teeth are being aligned and while the first and second member remain frictionally synchronized comprise:

said second member comprising a first gear supported by said shaft for relative axial movement thereto;

a synchronizer sleeve carried by the shaft for frictional engagement and mutual axial movement with the first gear when said first gear is moved axially, said sleeve having an axially projecting cam surface with a circumferential projection extending from said cam surface; and said shaft carrying a pin for engagement with said cam surface and said projection when said gear and sleeve are mutually moved axially.

* * * * *